United States Patent
Minick et al.

(10) Patent No.: US 10,309,344 B2
(45) Date of Patent: Jun. 4, 2019

(54) STORED PRESSURE DRIVEN CYCLE

(71) Applicant: Aerojet Rocketdyne, Inc., Sacramento, CA (US)

(72) Inventors: Alan B. Minick, Sacramento, CA (US); Timothy S. Kokan, Sacramento, CA (US); Jerrol W. Littles, Sacramento, CA (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 230 days.

(21) Appl. No.: 14/896,146

(22) PCT Filed: May 1, 2014

(86) PCT No.: PCT/US2014/036353
§ 371 (c)(1),
(2) Date: Dec. 4, 2015

(87) PCT Pub. No.: WO2015/012929
PCT Pub. Date: Jan. 29, 2015

(65) Prior Publication Data
US 2016/0131085 A1  May 12, 2016

Related U.S. Application Data

(60) Provisional application No. 61/832,421, filed on Jun. 7, 2013, provisional application No. 61/834,566, filed on Jun. 13, 2013.

(51) Int. Cl.
*F02K 9/46* (2006.01)
*F02K 9/48* (2006.01)
*F02K 9/50* (2006.01)
*B64G 1/40* (2006.01)

(52) U.S. Cl.
CPC ............... *F02K 9/48* (2013.01); *F02K 9/46* (2013.01); *F02K 9/50* (2013.01); *B64G 1/401* (2013.01)

(58) Field of Classification Search
CPC ..................................... F02K 9/46; F02K 9/48
See application file for complete search history.

(56) References Cited

U.S. PATENT DOCUMENTS

| | | | |
|---|---|---|---|
| 2,637,973 A | | 5/1953 | Lawrence, Jr. |
| 3,283,508 A | * | 11/1966 | Schulze .................... F02K 9/48 60/223 |
| 4,722,183 A | * | 2/1988 | Rosen .................... B64G 1/007 244/172.2 |
| 5,572,864 A | * | 11/1996 | Jones ........................ F02K 9/48 60/220 |
| 5,873,241 A | * | 2/1999 | Foust ........................ F02K 9/48 60/259 |

(Continued)

OTHER PUBLICATIONS

International Search Report for PCT Application No. PCT/US2014/0353 completed Feb. 10, 2015.

(Continued)

*Primary Examiner* — Gerald L Sung
*Assistant Examiner* — Rene D Ford
(74) *Attorney, Agent, or Firm* — Joel G. Landau

(57) ABSTRACT

A propulsion system according to an exemplary aspect of the present disclosure includes, among other things, a pressurant selectively released from a pressure tank to drive a pump to sustain propellant flow for main combustion.

12 Claims, 1 Drawing Sheet

(56) References Cited

U.S. PATENT DOCUMENTS

| | | | |
|---|---|---|---|
| 2002/0184875 A1 | 12/2002 | Knight | |
| 2007/0169461 A1* | 7/2007 | Koerner | C06B 47/02 |
| | | | 60/39.12 |
| 2008/0000217 A1* | 1/2008 | Erickson | F02K 9/48 |
| | | | 60/259 |
| 2011/0309074 A1* | 12/2011 | Thunhorst | F17C 1/16 |
| | | | 220/23.9 |

OTHER PUBLICATIONS

International Preliminary Report on Patentability for International Application No. PCT/US2014/036353 dated Dec. 17, 2015.

\* cited by examiner

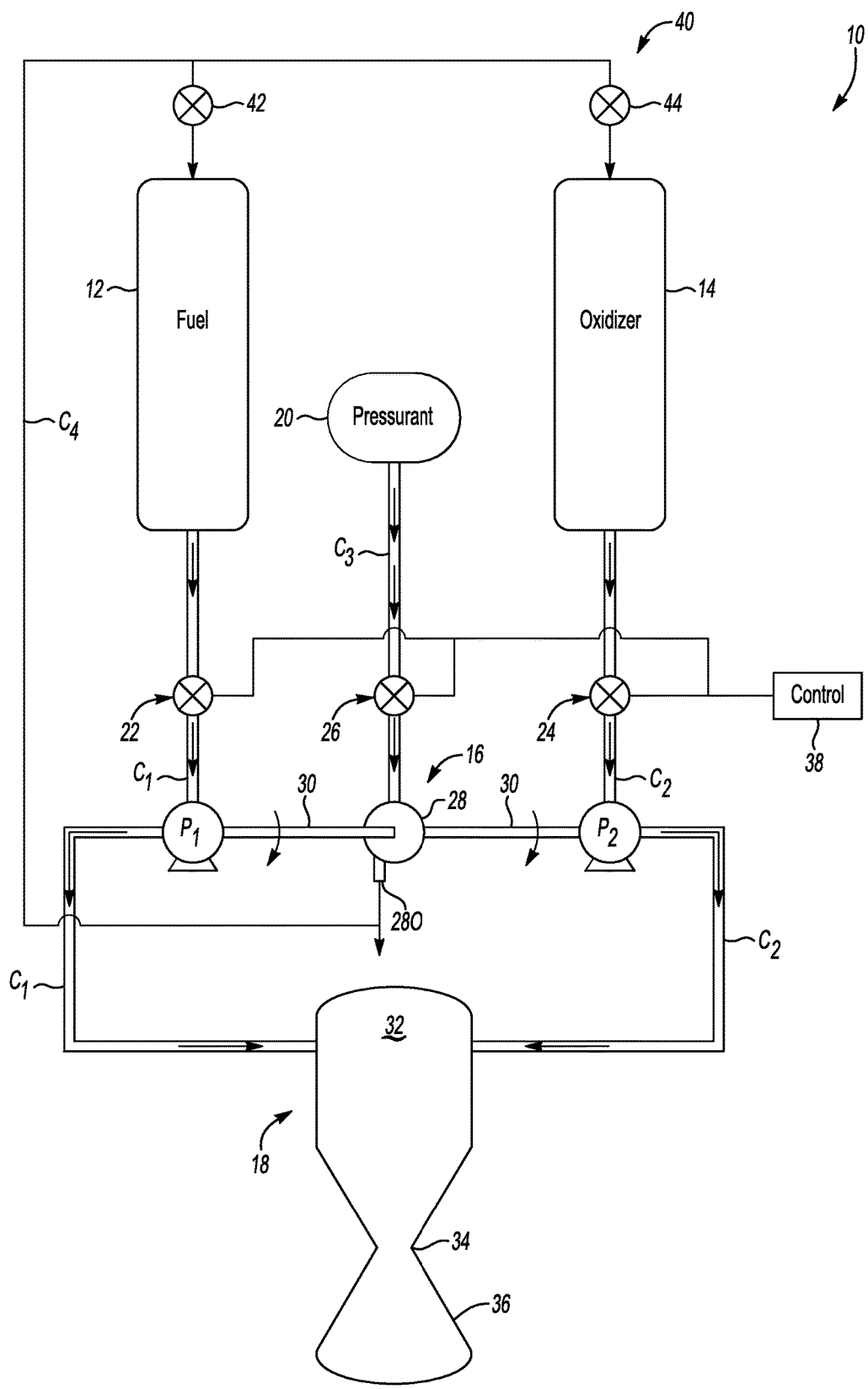

STORED PRESSURE DRIVEN CYCLE

RELATED APPLICATIONS

This application claims the benefit of U.S. Provisional Application No. 61/832,421, filed Jun. 7, 2013, and U.S. Provisional Application No. 61/834,566, filed Jun. 13, 2013, each of which are incorporated by reference herein in their entirety.

BACKGROUND

Rocket engines are arranged to combust at least one propellant, and commonly are arranged as a bi-propellant system including a fuel and an oxidizer.

One known type of rocket propulsion system includes a fuel tank and an oxidizer tank configured to store propellant at a relatively low pressure. This type of system further includes a turbopump, including a turbine in communication with at least one pump. In one example, after the initial start-up of the system, the main combustion phase is sustained by the turbine being driven by exhaust from a gas generator (e.g., a gas-generator cycle). In another example, the turbine is driven by a fluid heated in a heat exchanger (e.g., an expander cycle) to sustain the main combustion phase.

In another known rocket engine, propellant is stored at a relatively high pressure in one or more storage tanks. The propellant is then selectively released from the storage tanks and provided to the combustion chamber without being pressurized by a turbopump.

SUMMARY

A propulsion system according to an exemplary aspect of the present disclosure includes, among other things, a pressurant selectively released from a pressure tank to drive a pump to sustain propellant flow for main combustion.

In a further non-limiting embodiment of the foregoing propulsion system, the pressurant is stored in the pressure tank within a range of 500-12,000 psi.

In a further non-limiting embodiment of the foregoing propulsion system, the pressurant expands through a turbine to drive the pump.

A propulsion system according to another exemplary aspect of the present disclosure includes, among other things, a storage tank storing a propellant, a pressure tank storing a pressurant, a thrust chamber assembly configured to combust the propellant to generate thrust, and a pump in fluid communication with the storage tank. The pump is driven by pressurant selectively released from the pressure tank to sustain flow of the propellant for main combustion.

In a further non-limiting embodiment of the foregoing propulsion system, the storage tank is a first storage tank storing a first propellant, and the propulsion system further comprises a second storage tank storing a second propellant.

In a further non-limiting embodiment of the foregoing propulsion system, the pump is a first pump in fluid communication with the first storage tank, and the propulsion system further comprises a second pump in fluid communication with the second storage tank.

In a further non-limiting embodiment of the foregoing propulsion system, the first pump and the second pump are driven by pressurant selectively released from the pressure tank to sustain flow of the first propellant and the second propellant for main combustion.

In a further non-limiting embodiment of the foregoing propulsion system, the pressurant is expanded through a mechanism to drive at least one of the first pump and the second pump.

In a further non-limiting embodiment of the foregoing propulsion system, the mechanism is a turbine.

In a further non-limiting embodiment of the foregoing propulsion system, the pressurant is stored in the pressure tank at a pressure within a range of 500-12,000 psi.

In a further non-limiting embodiment of the foregoing propulsion system, an ullage in the first storage tank and an ullage in the second storage tank are regulated by pressurant selectively released from the pressure tank.

A method according to an exemplary aspect of the present disclosure includes selectively releasing a pressurant, driving at least one pump to sustain propellant flow for main combustion.

In a further non-limiting embodiment of the foregoing method, pressurant is selectively released to regulate an ullage in a propellant storage tank.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 1 schematically illustrates an example propulsion system.

DETAILED DESCRIPTION

FIG. 1 illustrates a general schematic view of a propulsion system. In this example, the propulsion system is a rocket engine 10. The illustrated engine 10 is exemplary. It should be understood that this disclosure is not limited to rocket engines, and extends to many types of propulsion systems. This disclosure further applies in the context of missiles, air breathing propulsion systems, and propulsion boost systems, as examples. This disclosure further applies to monopropellant and multi-propellant systems, as examples.

The engine 10 includes fuel and oxidizer storage tanks 12, 14 configured to store propellant (e.g., fuel and oxidizer, respectively), a turbopump 16, and a thrust chamber assembly 18 configured to combust the propellant and generate thrust. The engine 10 further includes a pressure tank 20 configured to store a pressurant which is used to drive the turbopump 16.

This disclosure provides a stored pressure driven cycle, in part because the turbopump 16 is driven by a "stored pressurant" (e.g., a pressurant which was stored in a storage tank and subsequently released therefrom to drive the turbopump) to sustain propellant flow for main combustion, as will be explained in detail below. In particular, after an initial start-up of the engine 10 (which may last on the order of a few seconds, in some examples), the flow of propellant for main combustion (which may last on the order of 500 seconds, in some examples) is sustained by the pressurant being selectively released from the pressure tank 20 to drive the turbopump 16.

With continued reference to the example of FIG. 1, the fuel storage tank 12 is in fluid communication with the combustion thrust chamber assembly 18 via a first passageway C1, and the oxidizer storage tank 14 is in fluid communication with the thrust chamber assembly via a second passageway C2. A first valve 22 may be provided between the fuel storage tank 12 and the turbopump 16 to selectively regulate a flow of fluid within the first passageway C1 Likewise, a second valve 24 may be provided between the oxidizer storage tank 14 and the turbopump 16 to selectively regulate a flow of fluid within the second passageway C2.

The pressure tank 20 is in fluid communication with the turbopump 16 by way of a third passageway C3. A valve 26 is provided between the pressure tank 20 and the turbopump 16 to selectively regulate a flow of fluid within the third passageway C3. It should be understood that the first, second and third passageways C1, C2 and C3 may each include a number of individual conduits. Further, in this example the valves 22, 24 and 26 are illustrated as solenoid valves, however other types of valves could be used.

In this example, the fuel storage tank 12 stores a fuel such as Hydrogen or Methane, however other types of fuels come within the scope of this disclosure. The oxidizer storage tank 14 is configured to store an oxidizer such as Oxygen or Hydrogen Peroxide, however other types of oxidizers come within the scope of this disclosure.

The pressurant in one example is stored in the pressure tank 20 at pressures up to about 12,000 psi. In one example, the pressurant is stored within a range of 500-12,000 psi. Example pressurants include Nitrous Oxide ($NO_X$), Butane, Tridyne, and Helium, however this disclosure is not limited to one particular type of pressurant.

The fuel and oxidizer are stored at pressures substantially less than the pressurant. While the pressurant may be stored at pressures up to about 12,000 psi, the fuel and oxidizer, on the other hand, are stored in their respective tanks 12, 14 at pressures on the order of about 70 psi, as an example.

Turning back to FIG. 1, the turbopump 16 includes at least one turbine and at least one pump configured to be driven to pressurize the propellant before combustion. In this example, the turbopump 16 includes a first pump P1 in fluid communication with the first passageway C1, a second pump P2 in fluid communication with the second passageway C2, and a turbine 28 in fluid communication with the third passageway C3. It should be understood that the turbopump 16 could include one or more turbines, and one or more pumps, depending on the application, however. The example turbopump 16 further includes a shaft 30 mechanically connecting the turbine 28 to the first and second pumps P1, P2, such that rotation of the turbine 28 drives the first and second pumps P1, P2. This disclosure further applies to systems where a mechanism other than a turbopump is used to drive the pumps P1, P2.

The thrust chamber assembly 18 generally includes a combustion chamber 32, and a nozzle having a throat 34 and a skirt 36. As is known in the art, propellant, in this example a fuel and an oxidizer, is provided to the combustion chamber 32 for combustion. Then, the products of the combustion are expanded and accelerated to apply a propulsive force.

In one example, the engine 10 includes a control 38 to selectively control the various valves, and to further control operation of the engine 10. The control 38 is not required, however, and the engine 10 may operate without a control. In one example, the engine 10 operates using mechanical regulation techniques, such as those including check valves and timing mechanisms.

As one skilled within this art would appreciate, the control 38 may include a microprocessor which can process inputs from the engine in real time. The control 38 may include hardware and software. The hardware consists of electronic components on a circuit board, one of which is a microcontroller chip (CPU). The control 38 is capable of storing software and being configured to be programmed to function as desired.

During operation of the engine, the control 38 is configured to selectively regulate the valves 22, 26 and 28 such that the pressurant stored within the pressure tank 20 is selectively released from the pressure tank 20, and expanded through the turbine 28. The turbine 28 in turn rotates the drive shaft 30, which drives the pumps P1, P2 to pressurize the fuel and oxidizer. The fuel and oxidizer are then pressurized, and are provided to the thrust chamber assembly 18 for combustion.

Downstream of the turbine 28, the pressurant discharged at the turbine outlet 28O may either be directed to the combustion chamber 32, directed to pressurize the fuel and oxidizer storage tanks 12, 14 (e.g., see the ullage regulation system 40, discussed below), or be discharged externally. Further, while not illustrated, a combustor or other energy enhancing device can be provided between the pressure tank 20 and the turbine 28 to enhance the pressurant before being expanded through the turbine 28. Additional combustors or energy enhancement devices can also be included at various points in the engine 10, as desired, without departing from the scope of this disclosure.

As explained above, the fuel and oxidizer are stored at relatively low pressures compared to the pressurant, and thus the fuel and oxidizer storage tanks 12, 14 can be made of materials and/or tank wall thicknesses rated for relatively low pressures, which are in turn less expensive and/or provide a relatively lightweight tank. While stored at relatively low pressures, the fuel and oxidizer are sufficiently pressurized for efficient operation of the engine 10 by the turbopump 16. The pressurant is stored in the pressure tank at a relatively high pressure, however the pressure tank 20 is relatively small in size compared to the combined size of the fuel and oxidizer storage tanks 12, 14. The penalties associated with storing fluids at high pressures are thus minimized, while maintaining an efficient level of engine operation. Further, the complexity associated with typical liquid rocket engine cycles is reduced.

In another aspect of this disclosure, the engine 10 includes an ullage system 40. The illustrated ullage system 40 need not be included, however, and the ullage in the fuel and oxidizer storage tanks 12, 14 may be regulated in some other manner. In the example engine 10, both the fuel and oxidizer are maintained in their respective storage tanks 12, 14 in a liquid state. The unfilled portion of the top of the containers, or ullage, has to be filled with a gas to ensure that the fuel and oxidizer are stored at a certain pressure.

The ullage system 40 includes a fourth passageway C4 extending between the turbine outlet 28O and the fuel and oxidizer storage tanks 12, 14. As with the passageways C1-C3, the fourth passageway C4 can include a number of individual conduits. A plurality of valves 42 and 44 may be provided in fluid communication with the fourth passageway C4. The control 38 may be in communication with the valves 42, 44, and may be configured to direct pressurant from the turbine outlet 28O to the fuel and storage tanks 12, 14, as needed. While two valves 42, 44 are illustrated, any number of valves can be provided. This disclosure further applies to systems where the passageway C4 may extend from other locations along the passageways C1, C2, C3 as well as other locations altogether, such as between turbine stages, as examples.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A propulsion system, comprising:
a pressurant selectively released from a pressure tank to a turbine to drive a pump to sustain a propellant flow for main combustion in a thrust chamber assembly after an initial start-up of a rocket engine, wherein the turbine is mechanically coupled to the pump, wherein there is no combustor and no energy enhancing device between the pressure tank and the turbine, wherein the pressurant discharged at an outlet of the turbine is not discharged to the thrust chamber assembly, wherein the pressurant is not in fluid communication with the propellant flow.

2. The propulsion system as recited in claim 1, wherein the pressurant is stored in the pressure tank within a range of 500-12,000 psi.

3. The propulsion system as recited in claim 1, wherein the pressurant expands through a turbine to drive the pump.

4. A propulsion system, comprising:
a storage tank storing a propellant;
a pressure tank storing a pressurant;
a thrust chamber assembly configured to combust the propellant to generate thrust;
a turbine fluidly coupled with the pressure tank;
a pump in fluid communication with the storage tank, wherein the pump is mechanically coupled with the turbine;
wherein the pump is driven by the turbine, wherein the turbine is driven by a pressurant selectively released from the pressure tank, wherein there is no combustor and no energy enhancing device between the pressure tank and the turbine, to sustain a flow of the propellant for main combustion after an initial start-up of a rocket engine, wherein the pressurant is not in fluid communication with the propellant flow, wherein the pressurant discharged at an outlet of the turbine is not discharged to the thrust chamber assembly.

5. The propulsion system as recited in claim 4, wherein the storage tank is a first storage tank storing a first propellant, and wherein the propulsion system further comprises a second storage tank storing a second propellant.

6. The propulsion system as recited in claim 5, wherein the pump is a first pump in fluid communication with the first storage tank, and wherein the propulsion system further comprises a second pump in fluid communication with the second storage tank.

7. The propulsion system as recited in claim 6, wherein the first pump and the second pump are driven by the pressurant selectively released from the pressure tank to sustain flow of the first propellant and the second propellant for main combustion.

8. The propulsion system as recited in claim 7, wherein the pressurant is expanded through the turbine to drive at least one of the first pump and the second pump.

9. The propulsion system as recited in claim 7, wherein the pressurant is stored in the pressure tank at a pressure within a range of 500-12,000 psi.

10. The propulsion system as recited in claim 7, an ullage in the first storage tank and an ullage in the second storage tank are regulated by the pressurant selectively released from the pressure tank.

11. A method of operating a propulsion system, comprising: selectively releasing a pressurant from a pressurant tank to a turbine after an initial start-up of a rocket engine, wherein there is no combustor and no energy enhancing device between the pressure tank and the turbine; and driving at least one pump with the turbine to sustain propellant flow for main combustion in a thrust chamber assembly, wherein the pressurant is not in fluid communication with the propellant flow, wherein the pressurant discharged at an outlet of the turbine is not discharged to the thrust chamber assembly.

12. The method as recited in claim 11, including the step of selectively releasing the pressurant to regulate an ullage in a propellant storage tank.

* * * * *